Jan. 2, 1934.                C. MARTINTO                1,941,908
                    COUPLING FOR SHAFTS FORMING ANGLES
                         Filed July 29, 1932           2 Sheets-Sheet 1
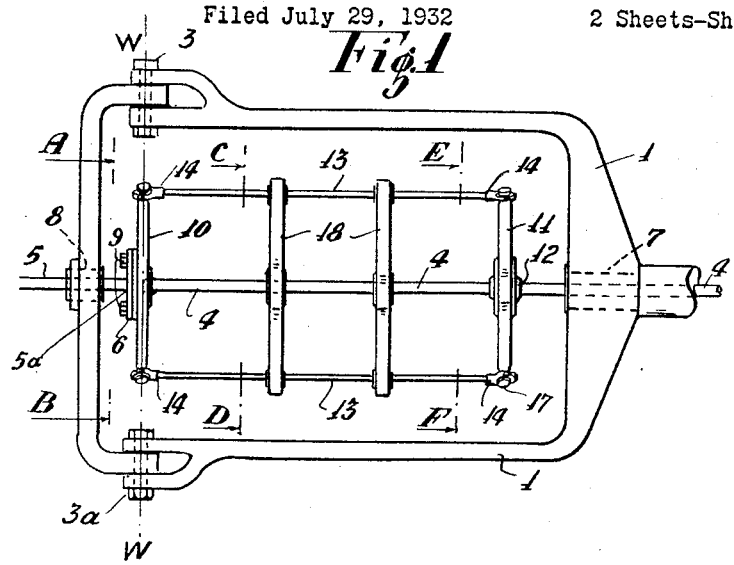
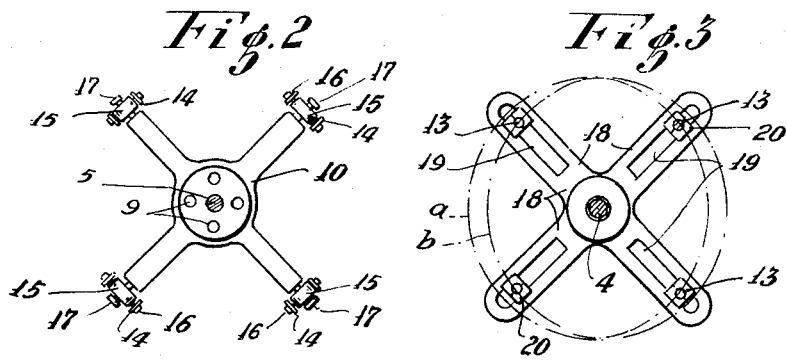
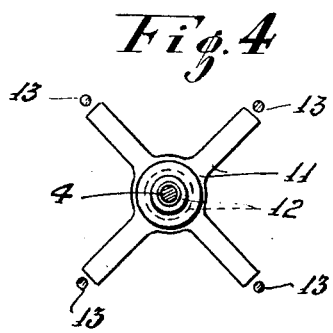
CESAR MARTINTO
    INVENTOR
BY Haseltine Lake & Co.
    ATTORNEYS Jan. 2, 1934.                C. MARTINTO                1,941,908
              COUPLING FOR SHAFTS FORMING ANGLES
                     Filed July 29, 1932              2 Sheets-Sheet 2
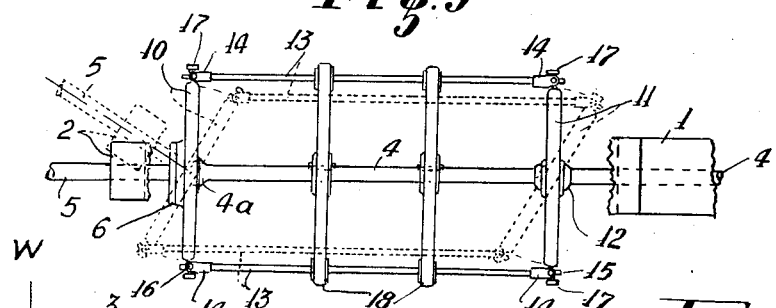
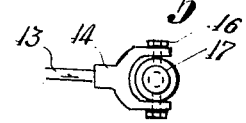
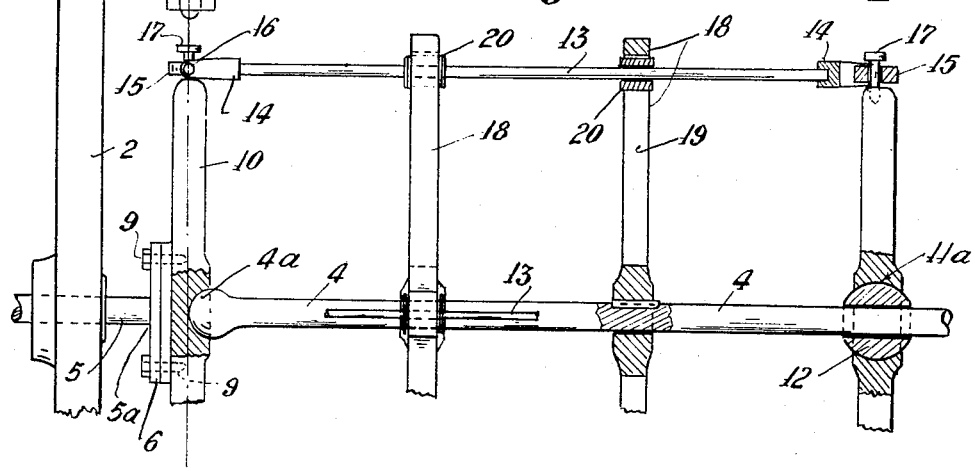
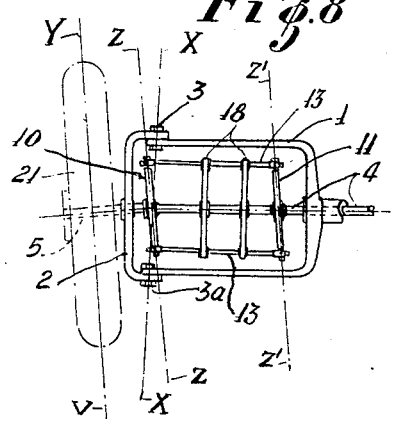
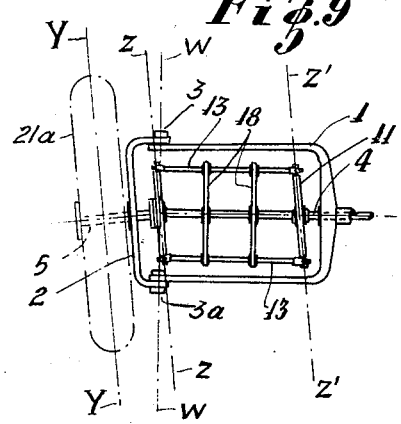
CESAR MARTINTO
INVENTOR
BY Haseltine, Lake & Co.
ATTORNEYS Patented Jan. 2, 1934

1,941,908

UNITED STATES PATENT OFFICE 1,941,908

COUPLING FOR SHAFTS FORMING ANGLES

César Martinto, Buenos Aires, Argentina

Application July 29, 1932, Serial No. 626,039, and in Argentina July 5, 1932

6 Claims. (Cl. 64—91)

This invention relates to a mechanism or flexible joint for coupling shafts forming an angle, or which may be caused to form an angle at any given moment, i. e. a coupling whose object is similar to that of the "Cardan" coupling, but mechanically this invention is more complete and more practical, as it eliminates several of the principal defects of the coupling just referred to.

It is well known that the "Cardan" coupling, and, in fact, a common universal joint transmits power between two shafts, between which a variable angle can be established; and generally in the case of such flexible couplings, for the purpose of transmitting the power of the rotating shaft to a rotated shaft disposed at a determined angle, fixed or variable,—as the case may be, without changing the direction of rotation, nor the number of revolutions in such couplings; and it is a fact that the angular speed of the driven shaft is variable, and its variations are in relation to the angle formed by the two coupled shafts, as has been established by the science of mechanics.

It is well known that this irregularity has been avoided by placing between the driving shaft and the driven shaft, an intermediate shaft having a joint at each of its ends, it being necessary that the angle formed at the junction of the shafts be equal to each other, thus forming a double "Cardan" coupling which produces the uniform rotation of the driven shaft.

The mechanism of the coupling as used in my invention, does not present the defect of the universal joint, when simply applied, namely that of variable speed, whilst at the same time the same results as those given by the double "Cardan" coupling are obtained, but in a more simple manner.

Another important advantage offered by my invention, is that the power required for transmission, is always the same, whatever may be the angle at which the coupled shafts be placed, within the limit allowed by the construction of universal joints.

The invention consists of an ingenious combination of elements, which may be summarized in the following manner:—

A bracket (or also a plate etc.), placed rigidly on a driven shaft, with another, as a guide is placed on the driving shaft, in such a manner that it be loose, and can move towards the side, whilst these two brackets act together, like collars, by means of a series of arms fixed at their joinings, there being connected with them other spokes fixed in the driving shaft, in such a manner, that when direction be changed,—of the driven shaft, the latter will always respond to the revolutions of said pieces by means of the spokes which act as brackets.

The apparatus can be used in all cases when the driven shaft ordinarily suffers variations with respect to the driving shaft, and can be employed in an immense number of applications in machinery, and more especially in cases of front propulsion of vehicles having automatic traction, as its use gives better results in running, than that of propulsion by the back wheels.

For the better comprehension of this invention, the attached drawings are now referred to, showing the preferential methods of its construction, in the following manner:—

Figure 1 offers a side view of this coupling mechanism, showing the shafts in normal aligned position.

Figure 2 shows a transverse view on line A—B, of Figure 1, showing the bracket of the driven shaft.

Figure 3 is a transverse section on line C—D, offering a view of the spokes of the driving shaft.

Figure 4 is a cross section, on line E—F, showing the guiding bracket of the driving shaft.

Figure 5 is a general view of the mechansm, when the coupled shafts form an angle.

Figure 6 is a partial view, in section, on a larger scale, giving a side view of the several elements which constitute the mechanism of the invention.

Figure 7 is a view in detail of the joints of the spokes or arms of one of the brackets.

Figure 8 shows the manner in which the mechanism can be applied to the front wheel of an automobile, when the frame is not vertical between its two pivots, as also the wheel itself.

Figure 9 is a view of this invention, similar to the preceding one, but in this case the pivoting of the frame is vertical, but this is not true of the position of the wheel.

In the foregoing drawings, I have employed the same numbers for the purposes of indicating the same, or corresponding parts.

The construction of the coupling mechanism, as shown in the attached drawings, consists of the U-shaped frame (1) into which piece 2 is connected by pivots 3 and 3$^a$, having free movement on a given plane (horizontally, as shown in drawings). The driving shaft is represented by the number 4, whilst number 5 shows the driven shaft, which receives power transmitted by the former from any source of power. The end 4$^a$, of the driving shaft 4, is preferentially spherical and is placed in contact with end piece 10 normally in line with the vertical line W—W of the pivots 3 and 3ª, (see Figures 1 and 6), whilst the end 5ª of the driven shaft 5, in front of the former shaft 4, terminates in plate 6, to which I will subsequently refer again. The first of the shafts mentioned, is concentric in relation to the frame 1, passing through it, resting on any class of bearings 7, (ball bearings or roller bearings); in such a manner that the shaft 4, can not be axially displaced; in a similar way, the driven shaft 5, passes through frame 2, resting on bearings 8, which facilitate running, but which can not move longitudinally.

Plate 6 of the shaft 5, is connected by the screws indicated by 9, to the spokes of the end piece or bracket, 10, at one of its sides, and at the other, receives the end of the round head 4ª of shaft 4, in a similar piece. Another guiding piece or guiding bracket 11, (see Figures 1, 4 etc.) having the same shape as the former, is loosely mounted on the driving shaft 4, in the spherical bearing 12, which not only permits it free action, but also allows it to move sideways.

This occurs, as may be appreciated by reference to Figure 6, when I adjust with a certain exactitude piece 11ª of the bracket indicated by 11 in the bearing 12.

Both brackets or end pieces 10 and 11, respectively, are connected by spokes 13, articulated by piece 14, fixed at the ends of said pieces 13, a ring 15, that takes its two arms, with the screws 16 and a rod 17, with a head passing through ring 15, and connected or screwed to the end of each of the pieces above mentioned.

Between the two loose bracket members (10 and 11) on the driving shaft 4, there is a system of rigid collar brackets (18) which is keyed to the shaft 4, preferentially the system formed by two collar brackets 18 and 18, at a slight distance, one from the other. Upon each of these elements there is a slot 19, in which slips the bearing 20, through which passes the corresponding piece 13, to which I have already referred. The aforesaid bearings 20, can be connected with the driving bracket in such a manner, that without preventing their movement, they can not come out from the slots 19. The said bearings 20, may be eliminated, if such be desired, to avoid any possiblity of friction, as their object is to protect the wearing away of pieces 13, and other frictional parts.

The mechanism so constituted, can be enclosed in a flexible covering, respecting which details are not necessary,—as such are secondary details, of no great importance relative to the object of the present invention, and its working, and which can be arranged in a practical form. The same may be said with respect to other mechanical details, such as oilers, greasers, number of spokes in the brackets, coverings etc.

In Figure 8, is an example in which the line X—X of the pivots 3 and 3ª, is disposed in a slanting direction, with a tendency to toe inward at the base. This represents a case of adapting the mechanism to a front wheel of an automobile with front propulsion, on whose driving shaft is mounted a wheel. This inclination, is a characteristic in front driven vehicles, as is well known, to facilitate the action of the driving wheel, diminishing the space for turning; so that the line indicated by letters X—X forms the axis, and line Y—Y the generating point of a revolving cone, (imaginary). If both lines converge on the ground, this point would be the vertex of the cone, and as may be supposed, would greatly facilitate the guiding of the car, as the principal point to be considered is to avoid all friction (without taking into consideration the speed of the vehicle and other similar circumstances). That is the reason why manufacturers of motor cars make the front wheels with a certain slant. In Figure 9, the axis W—W of pivots 3 and 3ª is normal, in relation to the mechanism, whilst line Z—Z (vertical axis of the wheel indicated by 21ª) is that which has been slanted with a tendency to approach the former line at the base. Respecting the others, they have the same relative positions, as in the foregoing case. It should be observed that the axes (W—W and X—X) of the pivots 3 and 3ª, pass in all cases, through the center of the driven bracket indicated by number 10.

The mechanism works in the following manner:—Under the supposition that the mechanism in question be in a normal position, that is to say, that its shafts indicated by numbers 4 and 5 rotate in the same direction, (see Figures 1 and 6), and that the driving shaft 4 is in movement, due to power of any origin, transmitted to the driven shaft 5. The driving shaft 4, when in movement, will also move the conducting or collar brackets 18, which act on pieces 13 causing them to move in a parallel manner round the same driving shaft 4, whose axis is the center of the system. The elements indicated by number 13, in their turn, cause the driven bracket 10, to move, whilst the latter, finally, the driven shaft 5. The path traced by members 13, is, in this case, circular, as shown by the circle "a" in Figure 3, as they are regulated by the loose bracket 11, generally. Let us now consider the case, when the driven shaft 5, has its position changed by end member 2 in relation to the shaft indicated by 4 (see Figure 5); the bracket 10 will follow this change of position, moving on the line of its vertical axle W—W (see Figure 1), and placing in the same position the other bracket 11, as both run parallel, due to the connection by members 13. In that position, the pieces indicated by number 13, slip down the slots 19, of the conducting brackets 18, whilst the latter act on the former in the same way as in the first case, but with the difference that now the path follows that of an ellipse "b", (see Figure 3) having, as may be supposed the lesser axis in position of horizontal plane, and the greater axis in a vertical plane, whilst the longitude of this latter a diameter equal to that of the circle indicated by letter "a", which represents the trajectory when the mechanism has its shafts arranged in a straight line. When end member 2 is in movement, then the brackets 10 and 11 also move; the former of these acts on the round head 4ª of the driving shaft 4, in order to keep it in its position, and altho it is a rigid piece, which is necessary, in case of the wearing of the bearings 7, or other circumstances. The second bracket moves, when slanted, in harmony with the former, on the spherical bearing 12, in such a manner that it responds to any position, within a certain allowed limit, in which the said bracket 10, may find itself.

It was also remarked that the power or rotatory force received by the shaft 4, is transmitted to the driven shaft 5, by means of the bracket 18, pieces 13, and the bracket 10; now when this changes place, then pieces 13 are longitudinally displaced, and this forces the bracket 11, also to change its position, the diverse elements occupying different positions, in the horizontal, as well as in the vertical plane, in relation to the other elements to which they are connected; (referring to dotted lines in Figure 5), and giving as a result that movement is communicated to the articulations at their ends. This is due to the element indicated by number 14, (see Figures 6 and 7) with their screws 16, fixed to rings 15, and these act and are fixed to the brackets by means of rods (17).

The reason therefor is clear, as reference to the drawings of the system, as shown in Figure 5, will show that in a quadrangular construction, constituted whenever shafts 4 and 5 are in line, a rhomboid results when they form an angle. Consequently, I can then comprehend the movements of pieces 13, in their connection with brackets 10 and 11, as well as those of their own, as one is guided by piece 2, and the other on bearing (spherical) 12. In the cases demonstrated in Figures 8 and 9, already referred to elsewhere, when the mechanism is adapted to the front wheels of a vehicle of automatic propulsion, for its movement by its front wheels, I find that the driven shaft 5, is rigidly connected in any common way to wheel 21, so as to transmit it its rotatory movement. This shaft 5, which is simply the axle of the wheel, must be slightly slanted downwards, as is the rule characteristically in all vehicles of auto-propulsion, for the well known reason of facilitating its direction when having to turn. For that reason, the lines Z—Z and Z'—Z' of the vertical axes of the vertical axes of the brackets 10 and 11, remain parallel, and with the vertical axis Y—Y of wheel 21, and consequently the system will work in this parallel way. With respect to the lines of horizontal axles of those three elements, they will also remain in that state, as may easily be observed, by reference to Figure 5 (in which the wheel and axis lines are not indicated). Whenever the vehicle be turned round, as may be supposed, the wheel 21 will move along line X—X, (see Figure 8) or along lines W—W and X—X passing through the intersection of the axis lines of the two shafts.

From the foregoing, I may comprehend the working of the mechanism in the following manner:—In any position in which the driven shaft 5, may be, within a certain limit, forming an angle with the driving shaft 4, the former shaft will always find itself perpendicular to the bracket 10, for the reason that it is rigidly connected thereto; and this bracket, on the other hand, will remain parallel to the loose bracket 11, due to the arbitrary union of pieces 13, which also move in parallel function. With respect to brackets 18, (propulsion elements) they will be found, due to their fixed position on the driving shaft 4, in a position which can not be changed. The reason for the employment of two of these brackets 18, is to avoid a possible disarrangement in the parallel position of elements 13, due to a twisting movement, in view of the fact that bracket 11 has a loose movement, as is usual in these cases. It is also feasible, having this circumstance in view, to make use of a bracket, much wider than bracket 18, so that it would be of greater length on pieces 13, thus avoiding that defect. By use of the mechanism, constructed as I have already explained, I obtain the movement or angular speed of the driven shaft 5, in a uniform manner.

Moreover, in this way, I find that there is no loss of power in the working of the mechanism (save that due to friction, as is natural, in all apparatus in movement),—not taking into account the angle of deviation of the shaft up to its possible limit, if analyzed, the movements of bracket 18, will show that they compensate themselves, with respect to shaft 4, with those of bracket 10, and, it may be said, they remain in a dynamic state of equilibrium. Frame 1, and its corresponding element 2, may be substituted by other equivalent elements, when I may desire to apply my mechanism to the front propulsion of automobiles, in which there will be a connection between the oscillating element of said frame 2, and the guiding element. In other cases, when the elements first mentioned are not required to obtain similar results, it then would be sufficient to fix the two shafts 4 and 5, in end bearings, such as those indicated by 2 and 8, which prevent their axial displacement; but, even admitting such displacement, as occurs in the use of universal couplings. As it is indispensible that the intersection point of the two axes of the shafts shall not be displaced cross-ways, this is done by either using solid bearings, close to the coupling on each shaft, or by the use at the ends of the shafts of spherical settings, or giving them the shape of a collar, or with salients at the ends, to prevent them slipping. Such mechanical details not specified herein, not being requisite in this report for the comprehension of my invention, can be arranged as is customary in practice, such as, for instance, the brackets, which instead of having spokes, might be circular, or even with any other number of spokes, or else the brackets might be square etc.

Consequently, it is evident that certain modifications might be introduced in my invention, without altering its nature, as clearly specified in the subsequent claims.

Having thus described in detail, and explained the nature of this invention, as well as the manner of its use, I hereby claim as of my sole property and exclusive right, the following:—

1. A coupling for shafts adapted to form a variable angle with respect to each other, including in combination, a driving shaft, a driven shaft, a stationary bearing member for said driving shaft, a bearing member for said driven shaft pivotally connected to said stationary bearing member so as to be swingable upon the same upon the meeting point of the axes of the driving and driven shafts, one or more propulsion members fixed upon the driving shaft between the connected bearing members so as to rotate with said shaft, a rotated member fixed upon the driven shaft at said meeting point of both shafts, plural transmission means connected to said rotated member and disposed in contact with said propulsion members to transmit movement from the latter to said rotated member, and guide means loose upon the driving shaft and connected to said plural transmission means in order to retain the same in parallelism with the driving shaft.

2. A coupling or joint according to claim 1 wherein the stationary bearing member is deeply bifurcated while the other bearing member is relatively shallow and the end of the driving shaft terminates against the rotated member which forms a bearing for said end.

3. A coupling for shafts adapted to form a variable angle with respect to each other, including in combination, a driving shaft, a driven shaft, a stationary bearing member for said driving shaft, a bearing member for said driven shaft pivotally connected to said stationary bearing member so as to be swingable upon the same upon the meeting point of the axes of the driving and driven shafts, one or more slotted propulsion members fixed upon the driving shaft between the connected bearing members so as to rotate with said shaft, a rotated member fixed upon the driven shaft at said meeting point of both shafts, two or more spaced rods connected to said rotated member and passing through the slots in said slotted propulsion member or members in order to transmit movement from the latter to said rotated member, and a guide member loosely mounted upon the driving shaft and connected to said rods in order to retain the same in parallelism with the driving shaft and with each other.

4. A coupling or joint according to claim 3 wherein the loose mounting of the guide member upon the driving shafts consists of a spherical bearing which allows said member to swivel upon the same in all directions.

5. A coupling or joint according to claim 3 wherein the guide member is connected to one end of each of the rods while the other end of each of said rods is connected to the rotated member in order to retain parallelism between the guide member and the rotated member and the relative parallelism between said rods and the driving shaft during rotation of said shaft.

6. A coupling or joint according to claim 3 wherein the driving shaft terminates in a ball which is housed in a socket disposed upon the rotated member at the meeting point of the driving and driven shafts.

CÉSAR MARTINTO.